3,142,632
METHOD OF MANUFACTURE OF PARAFFINS HAVING A LOW MELTING-POINT AND AN ISO- AND/OR CYCLO-PARAFFINIC STRUCTURE

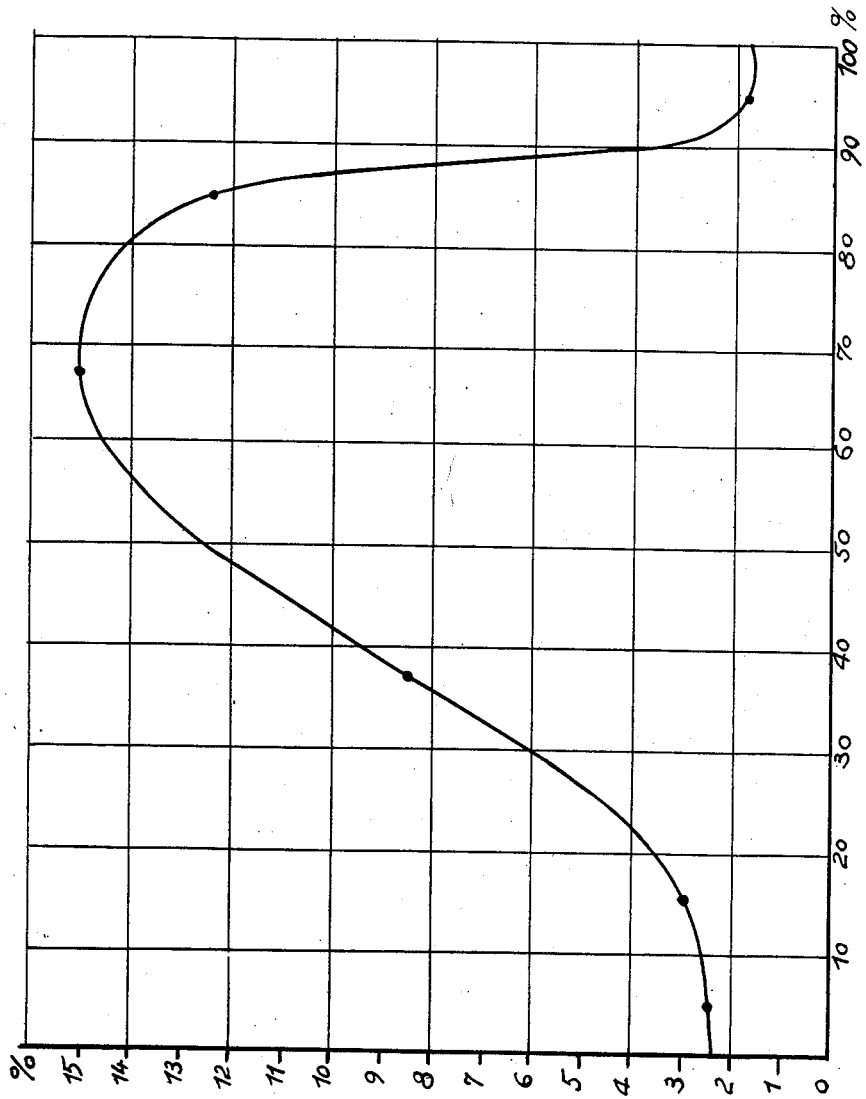

René Sigwalt, Neuilly, and Alexandre Chmelevsky, Le Havre, France, assignors to Compagnie Francaise de Raffinage, Paris, France, a corporation of France
Filed June 13, 1961, Ser. No. 116,748
Claims priority, application France June 20, 1960
8 Claims. (Cl. 208—32)

The present invention relates to a method of manufacture of paraffins with a low-melting point and an iso-paraffinic and/or a cycloparaffinic structure from petroleums with a paraffinic or semi-paraffinic base, and more particularly from their "crystalline" paraffin distillates, refined or unrefined, the viscosity of which at 100° C. is comprised between about 3 and 9 centistokes.

The paraffin constituents present in the crystalline paraffin distillates are semi-solid or solid at ordinary temperatures, their physical state and the variation of that state, that is to say their temperature of fusion or solidification, being a function not only of their molecular weight but also of their chemical structure. The more their structure is of an isoparaffinic or cycloparaffinic nature, the more their melting point is lowered with respect to that of the straight-chain paraffin of the same molecular weight. There are thus found in the distillates, constituents having very different melting points.

From these mixtures, by the operations of deparaffining, fractions of solid constituents are separated-out, the commercial paraffins having a melting point of at least 48° C. but possibly comprising variable proportions (although always relatively low) of paraffins having a melting point up to about 40° C. The constituents of these fractions are of a mainly n-paraffinic structure, and are herein referred to as "higher melting paraffins."

With regard to the constituents having a melting point between about 20° C. and 48° C., which will hereinafter be termed "lower melting paraffins," because of their low melting point they do not lend themselves to the applications for which the commercial paraffins are generally intended. For this reason, while their separation is possible in principle by the solvent method, it is in general not employed. On the other hand, when the sweating process is used, the constituents cannot be separated out by reason of their unfortunate action on the n-paraffins to which they lose their good sweating properties.

Researches made by us have shown that this action is due to the fact that these paraffins possess an isoparaffinic and/or cycloparaffinic structure, that they crystallise in the form of lamellae with more or less curled edges, and when their content exceeds certain values, they inhibit crystallization in the form of large needles of n-paraffins which can be sweated, and are thus related to their higher homologues, the petroleum waxes.

On the other hand, however, we have discovered that if one succeeds in freeing the major portion of the n-paraffinic constituents from them, the paraffins of isoparaffinic and cycloparaffinic nature sweat like the others in a satisfactory manner, this fact being totally unexpected in view of the foregoing discussion.

When their proportion reaches or exceeds 95%, they can themselves impose their own mode of crystallization.

The table given below and the curve shown on the accompanying drawing illustrate these phenomena and show how the content of oil in sweated paraffins (ordinates) varies in accordance with the proportion of isoparaffins, cycloparaffins and n-paraffins in the mixtures to be sweated (abscissae).

TABLE 1

| Distribution of the paraffins in the slack wax to be sweated | | Percent oil in the paraffin sweated [1] |
|---|---|---|
| Iso- and cyclo-paraffins, percent by weight | Normal paraffins, percent by weight | |
| 5 | 95 | 2.3 |
| 16 | 84 | 3.0 |
| 38 | 62 | 8.5 |
| 68 | 32 | 15.0 |
| 84 | 16 | 12.5 |
| 94 | 6 | 1.8 |

[1] Oil content of the charge to be sweated _____ 17 to 20%
Yield in sweated paraffin _____ 17 to 23%

The method of manufacture of iso- and cyclo-paraffins which forms the object of the invention and which results from the researches and observations referred to above comprises two successive treatments, namely:

The separation of the iso- and cyclo-paraffins from their mixtures with n-paraffins by two successive crystallization stages in solvents at appropriate separation temperatures.

Then the sweating of the iso- and cyclo-paraffins obtained, free from or with a sufficiently low content of n-paraffins.

(1) The separation of the iso- and/or cyclo-paraffins can be carried out in various ways by the usual techniques of deparaffining with a solvent.

In a first method of operation, the first step is the separation at low temperature, of the order of −25 to −35° C., from a paraffin distillate having a viscosity at 100° C. of between 3 and 9 centistokes, of the mixture of normal paraffins and the iso- and cyclo-paraffins in the form of a slack wax. The slack wax is then fractionated by treatment with a solvent at a less low temperature, of the order of −15° to +15° C., so as to obtain the solution in the solvent of the iso- and/or cyclo-paraffins in the form of a filtrate.

In an alternative method, the separation is effected successively from the said paraffin distillate: first of all of the n-paraffins by crystallization and filtration at the fairly low temperature of the order of −15° to +15° C., and then the iso- and/or cyclo-paraffins are separated from the filtrate obtained by a fresh crystallization and filtration at low temperatures of the order of −25° to −35° C.

It will of course be understood that the solvent employed is known per se; by way of non-limitative examples, it may be constituted by ketones and aromatic hydrocarbons, by chlorinated derivatives, etc. In the same way, the most favorable proportions of solvent are determined according to the rules of the art.

(2) The fraction of the paraffins with a low boiling point obtained by either of the above methods of operation, is freed from the solvent which it contains by heating and evaporation. The slack wax obtained, which may still contain from 10 to 40% (and most frequently 20 to 30%) of oily constituent, but which is free from n-paraffins or contains only small quantities of these, is sweatable and, according to the second characteristic feature of the present invention, the wax is subjected to this operation following the technique, known per se, of sweating of normal paraffins. This leaves as a final product the iso- or cyclo-paraffins of the desired purity.

The compositions of these products and their characteristics, in particular their melting points, are a function of the temperatures at which they have been crystallized and filtered in order to separate them from the n-paraffins before sweating. As a general rule, the lower the desired melting point of the paraffins, the lower must be the temperature of separation within the temperature ranges already indicated, namely from +15° to −15° C. for the mean temperature and from −25° to −35° C. for the lowest temperature, it being understood that these ranges are in no way restrictive or limitative.

The iso- and cyclo-paraffins, when once isolated, have advantageous properties. When added in suitable proportions to the n-paraffins, they improve certain characteristics of application of these paraffins, such as plasticity, impermeability and adhesiveness.

The method according to the invention is illustrated in the examples given below.

*Example 1*

A paraffin distillate, previously refined with furfural with a view to the manufacture of a lubricating oil 350 Neutral, is de-paraffined by the solvent method, using methyl-ethyl-ketone–aromatic hydrocarbons at a temperature of −26° C.

After re-washing with the solvent at the same temperature, the slack wax obtained, which still contains 11% of oil, comprises for the remainder a mixture of normal paraffins and paraffins having an iso- and cyclo-paraffin structure.

This wax is dissolved by increasing the temperature sufficiently in the solvent, using 6 parts of solvent to 1 part of slack wax. This is then cooled and crystallized at +12° C., and is then filtered and washed with 3 parts of solvent to obtain a paraffin which, when all the solvent has been eliminated, has a melting point of 62° C. and a content of oil less than 0.6% by weight. The yield is 58.5% by weight with respect to the starting slack wax.

The filtrate at +12° C. is evaporated and leaves a new paraffin wax with a low melting point which, when the solvent has been eliminated, has a melting point of 34.8° C., and an oil content of 26%. The yield is 41.5% by weight.

The new slack wax is left to crystallize between +15° C. and +20° C. and it is subjected to sweating following the conventional practice. After separation of the sweating oils, a paraffin is collected having a melting point of 44.6° C., containing only 1.3% of oil and less than 5% of normal paraffins. The yield is 14%.

*Example 2*

A paraffin distillate, previously refined with furfural with a view to the manufacture of a 200 Neutral oil, is de-paraffined by the solvent method at a temperature of −27° C.

After re-washing with solvent at the same temperature the slack wax obtained, with the exception of an oil content of 13%, comprises as in Example 1 the mixture of normal paraffins with iso- and/or cyclo-paraffinic constituents.

This material is re-dissolved in 5 volumes of solvent by increasing the temperature sufficiently, after which it is crystallized at +11° C., filtered and washed with 3 volumes of solvent at +11° C.

The insoluble portion is a hard paraffin which, when all the solvent is driven-off melts at 59.3° C. and contains less than 0.6% of oil. The yield is 56.4% of the starting material.

When the filtrate has been evaporated at +11° C., there is obtained a new slack paraffin wax having a low melting point (36.3° C.), and an oil content of 29%. The yield is 43.6%.

The new slack wax is left to crystallize between +15° C. and +20° C., after which it is treated by sweating.

After elimination of the sweating oils, the paraffin collected has a melting point of 45.2° C. It contains only 1.1% of oil and a very small quantity of n-paraffins.

What we claim is:

1. In a method for the sweating purification of oily fractions of crystalline isoparaffins and cycloparaffins having melting point ranges between about 20° and 48° C. from waxy petroleum distillates including higher melting normal paraffins admixed with lower melting paraffins of iso- or cyclo-structure and non-crystalline oily components, the steps which comprise fractionating said petroleum distillates by successive solvent dewaxing and crystallization steps into a higher melting normal paraffinic crystalline fraction and a lower melting crystalline slack wax fraction including said lower melting isoparaffins and cycloparaffins and a non-crystalline oily fraction, said lower melting slack wax fraction being substantially freed of normal paraffins but still retaining about 10–40% of said oily components, and sweating said lower melting slack wax fraction for removing therefrom of substantially all said oily components to produce said purified crystalline isoparaffins and cycloparaffins.

2. The method as recited in claim 1 in which said waxy petroleum distillates are characterized by having a viscosity within a range of about 3 to 9 centistokes at 100° C.

3. The method as recited in claim 1 in which said higher melting normal paraffinic crystalline fraction is separated by crystallization at low temperatures within the range of approximately −15° C. to +15° C., and in which said lower melting crystalline slack wax fraction is separated by crystallization at low temperatures within the range of approximately −25° to −35° C.

4. The method as recited in claim 1 in which said retained proportion of oily components in said slack wax fraction is approximately 20–30%.

5. In a method for the sweating purification of oily fractions of crystalline isoparaffins and cycloparaffins having melting point ranges between about 20° and 48° C. from waxy petroleum distillates including higher melting normal paraffins admixed with lower melting paraffins of iso- or cyclo-structure and non-crystalline oily components, the steps which comprise fractionating said petroleum distillates by solvent dewaxing and crystallization into a higher melting normal paraffinic fraction and a lower melting fraction including oily components and said lower melting isoparaffins and cycloparaffins, said lower melting fraction being substantially freed of normal paraffins, fractionating said lower melting fraction by solvent dewaxing and crystallization into an oily fraction substantially free of crystalline components and a slack wax fraction including said isoparaffins and cycloparaffins and a retained proportion of about 10–40% of said oily components, and sweating said slack wax fraction for removing therefrom of substantially all said oily components to produce said purified crystalline isoparaffins and cycloparaffins.

6. The method as recited in claim 5 in which said higher melting normal paraffinic fraction is separated by crystallization at a low temperature within the range of about −15° to +15° C., and in which said lower melting slack wax fraction is separated by crystallization at a low temperature within the range of about −25° to −35° C.

7. In a method for the sweating purification of oily fractions of crystalline isoparaffins and cycloparaffins having melting point ranges between about 20° and 48° C. from waxy petroleum distillates including higher melting normal paraffins admixed with lower melting paraffins of iso- or cyclo-structure and non-crystalline oily components, the steps which comprise fractionating said petroleum distillates by solvent dewaxing and crystallization into an oily fraction substantially free of crystalline components and a crystalline fraction including said normal paraffins and said lower melting isoparaffins and cycloparaffins, fractionating said crystalline fraction by solvent dewaxing and crystallization into a higher melting normal paraffinic fraction and a slack wax fraction including said isoparaffins and cycloparaffins and a retained proportion of about 10–40% of said oily components and substantially free of normal paraffins, and sweating said slack wax fraction for removing therefrom of substantially all said retained oily components to produce said purified crystalline isoparaffins and cycloparaffins.

8. The method as recited in claim 7 in which said higher melting normal paraffinic fraction is separated by crystallization at a low temperature within the range of about $-15°$ to $+15°$ C., and in which said lower melting slack wax fraction is separated by crystallization at a low temperature within the range of about $-25°$ to $-35°$ C.

References Cited in the file of this patent

UNITED STATES PATENTS

| | | |
|---|---|---|
| 1,998,747 | Adams | Apr. 23, 1935 |
| 2,099,683 | Ferris et al. | Nov. 23, 1937 |
| 2,737,470 | Perry et al. | Mar. 6, 1956 |
| 2,967,817 | Marple et al. | Jan. 10, 1961 |